(12) United States Patent
Bhatoolaul et al.

(10) Patent No.: US 12,213,204 B2
(45) Date of Patent: Jan. 28, 2025

(54) MAINTAINING, SUSPENDING, OR MODIFYING EXISTING PUR CONFIGURATION IN RESPONSE TO A UE ENTERING INTO RRC CONNECTED MODE

(71) Applicant: NOKIA TECHNOLOGIES OY, Espoo (FI)

(72) Inventors: David Bhatoolaul, Swindon (GB); Srinivasan Selvaganapathy, Bangalore (IN); Nitin Mangalvedhe, Hoffman Estates, IL (US); Rapeepat Ratasuk, Inverness, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 685 days.

(21) Appl. No.: 17/430,807

(22) PCT Filed: Feb. 11, 2020

(86) PCT No.: PCT/EP2020/053436
§ 371 (c)(1),
(2) Date: Aug. 13, 2021

(87) PCT Pub. No.: WO2020/165148
PCT Pub. Date: Aug. 20, 2020

(65) Prior Publication Data
US 2022/0167457 A1    May 26, 2022

(30) Foreign Application Priority Data
Feb. 15, 2019   (IN) .............................. 201941005969

(51) Int. Cl.
*H04W 76/27*   (2018.01)
*H04W 68/00*   (2009.01)

(52) U.S. Cl.
CPC ........... *H04W 76/27* (2018.02); *H04W 68/00* (2013.01)

(58) Field of Classification Search
CPC .............................. H04W 76/27; H04W 68/00
See application file for complete search history.

(56) References Cited

U.S. PATENT DOCUMENTS

2021/0168746 A1\*  6/2021  Mi ....................... H04W 56/006
2021/0168895 A1\*  6/2021  Sha ........................ H04W 72/23
(Continued)

FOREIGN PATENT DOCUMENTS

CN           102333341 A        1/2012

OTHER PUBLICATIONS

Huawei et al., "Feature Lead Summary of Support for Transmission in Preconfigured UL Resources", 3GPP TSG RAN WG1 Meeting #94b, R1-1811697, (Oct. 8-12, 2018), 13 pages.
(Continued)

*Primary Examiner* — Ashley Shivers
(74) *Attorney, Agent, or Firm* — Lippes Mathias LLP (57) ABSTRACT

At a UE configured with an idle-mode configuration for using a PUR, determining that data not associated with the PUR is to be transmitted or received via an RRC connection. The UE performs an initial access to a network for the radio resource control connection. The UE transitions from RRC idle mode to RRC connected mode. The UE performs one of suspending the idle-mode configuration or maintaining the idle-mode configuration, for at least a duration of the RRC connected mode. A base station received the initial access, determines the UE is configured with the idle-mode configuration for using a PUR and transitions the UE from RRC idle mode to RRC connected mode. The base station performs communication between the base station and the UE to perform action(s) to modify one or both of the idle-mode (Continued)

configuration or an RRC connection corresponding to the transition into the RRC connected mode.

19 Claims, 6 Drawing Sheets

(56) References Cited

U.S. PATENT DOCUMENTS

| | | | |
|---|---|---|---|
| 2022/0038997 A1* | 2/2022 | Höglund | H04W 48/06 |
| 2022/0104306 A1* | 3/2022 | Shrestha | H04W 76/27 |

OTHER PUBLICATIONS

Huawei et al., "Feature Lead Summary of Support for Transmission in Preconfigured UL Resources", 3GPP TSG RAN WG1 Meeting #95, R1-1813717, (Nov. 12-16, 2018), 20 pages.
International Search Report and Written Opinion for Patent Cooperation Treaty Application No. PCT/EP2020/053436 dated May 8, 2020, 13 pages.
Samsung, "Discussion on Transmission in Preconfigured UL Resources for NB-IoT", 3GPP TSG RAN WG1 Meeting #95, R1-1812947, (Nov. 12-16, 2018), 6 pages.
Sierra Wireless, "NB-IOT Pre-Configured UL Resources Design Considerations", 3GPP TSG RAN WG1 Meeting #94bis, R1-1810490, (Oct. 8-12, 2018), 9 pages.
First Examination Report for Indian Application No. 202147040865 dated Jun. 14, 2022, 6 pages.
Office Action for European Application No. 20705040.2 dated May 16, 2023, 6 pages.
The Second Office Action of the CNIPA relating to App. No. 202080028941X dated May 11, 2024.
Machine translation of The Second Office Action of the CNIPA relating to App. No. 202080028941X dated May 11, 2024.
"Email discussions after RAN2#104", 3GPP, Retrieved on Aug. 2, 2024, Webpage available at : https://view.officeapps.live.com/op/view.aspx?src=https%3A%2F%2Fwww.3gpp.org%2Fftp%2FTSG_RAN%2FWG2_RL2%2FTSGR2_104%2FRAN2-104-email-discussions-v2.docx&wdOrigin=BROWSELINK.
"3rd Generation Partnership Project; Technical Specification Group Radio Access Network; Evolved Universal Terrestrial Radio Access (E-UTRA); Multiplexing and channel coding (Release 8)", 3GPP TS 36.212, V8.6.0, Mar. 2009, pp. 1-59.
"Views on Small Cell On/Off with Small Cell Discovery", 3GPP TSG RAN WG1 Meeting #74bis, R1-134496, Agenda: 7.2.6.1.1, NTT Docomo, Oct. 7-11, 2013, pp. 1-5.
"3rd Generation Partnership Project; Technical Specification Group Radio Access Network; NR; NR and NG-RAN Overall Description; Stage 2 (Release 17)", 3GPP TS 38.300, V17.6.0, Sep. 2023, pp. 1-211.
"3rd Generation Partnership Project; Technical Specification Group Radio Access Network; Evolved Universal Terrestrial Radio Access (E-UTRA); Radio Resource Control (RRC); Protocol specification (Release 17)", 3GPP TS 36.331, V17.6.0, Sep. 2023, pp. 1-1137.
Office action received for corresponding Chinese Patent Application No. 202080028941.X, dated Feb. 27, 2024, 7 pages of office action and no page of translation available.
EPO R7(3) Communication, Oct. 14, 2024.

* cited by examiner

MAINTAINING, SUSPENDING, OR MODIFYING EXISTING PUR CONFIGURATION IN RESPONSE TO A UE ENTERING INTO RRC CONNECTED MODE

CROSS-REFERENCE TO RELATED APPLICATIONS

This application is a national phase entry of International Application No. PCT/EP2020/053436, filed Feb. 11, 2020, which claims priority to Indian Application No. 201941005969, filed Feb. 15, 2019, the entire contents of which are incorporated herein by reference.

TECHNICAL FIELD

This invention relates generally to communication using preconfigured uplink resources (PURs) for User Equipment (UEs) and, more specifically, relates to Radio Resource Control (RRC) connections for UEs configured with PURs.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, at the beginning of the detailed description section.

A new Work Item (WI) for further enhancements to Machine Type Communication (MTC)/Narrow Band-Internet of Things (NB-IoT) is approved for Release 16 (Rel-16). One of the objectives of this WI is to support transmission over preconfigured uplink resources (PURs) for User Equipment (UEs) having valid timing advance in idle mode or connected mode. Currently, only dedicated PUR (D-PUR) in idle mode is supported. Dedicated means that a unique or dedicated time-frequency resource is reserved for each UE configured with PUR. In RAN1 #95, the following D-PUR agreements relevant to the examples herein were made.

A first agreement was as follows: For dedicated PUR in idle mode, an uplink (UL) grant for Hybrid Automatic Repeat reQuest (HARD) retransmission is transmitted in MTC Physical Downlink Control CHannel (MPDCCH) search space. It is For Further Study (FFS) as to the details on the search space (for example UE specific Search Space (USS), or Common Search Space (CSS)).

A second agreement was as follows: For dedicated PUR in idle mode, upon successful decoding by eNB of a PUR transmission, the UE can expect an explicit acknowledgement (ACK). It is FFS if the ACK is sent on MPDCCH (layer 1) and/or Physical Downlink Shared CHannel (PDSCH) (layer 2/3). This is to be included in a Liaison Statement (LS) to RAN2, RAN4.

A third agreement was as follows: For dedicated PUR in idle mode, upon unsuccessful decoding by eNB of a PUR transmission, the UE can expect the following:
1) an UL GRANT for retransmission on the MPDCCH, or
2) FFS: a NACK, or
3) FFS: no explicit ACK.

In a RAN2 email discussion discussing various D-PUR related signaling, Email discussion [104 #43][eMTC & NB-IoT R16] D-PUR report, there is the following question raised:

Question 26. Are there other scenarios for release of a D-PUR allocation and methods to apply the release?

Internal examination of this question by the inventors, raises another as yet unpublished question:

How should Radio Resource Control (RRC) connections be handled that are between and overlapping with PUR opportunities?

BRIEF SUMMARY

This section is intended to include examples and is not intended to be limiting.

In an exemplary embodiment, a method is disclosed that includes determining, at a user equipment configured with an idle-mode configuration for using a preconfigured uplink resource, that data not associated with the preconfigured uplink resource is to be transmitted or to be received via a radio resource control connection. The method includes performing by the user equipment an initial access to a network for the radio resource control connection. The method also includes transitioning, by the user equipment, from radio resource control idle mode to radio resource control connected mode. The method includes the user equipment performing one of suspending the idle-mode configuration or maintaining the idle-mode configuration, for at least a duration of the radio resource control connected mode.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform at least the following: determining, at a user equipment configured with an idle-mode configuration for using a preconfigured uplink resource, that data not associated with the preconfigured uplink resource is to be transmitted or to be received via a radio resource control connection; performing by the user equipment an initial access to a network for the radio resource control connection; transitioning, by the user equipment, from radio resource control idle mode to radio resource control connected mode; and the user equipment performing one of suspending the idle-mode configuration or maintaining the idle-mode configuration, for at least a duration of the radio resource control connected mode.

An exemplary computer program product includes a computer-readable storage medium bearing computer program code embodied therein for use with a computer. The computer program code includes: code for determining, at a user equipment configured with an idle-mode configuration for using a preconfigured uplink resource, that data not associated with the preconfigured uplink resource is to be transmitted or to be received via a radio resource control connection; code for performing by the user equipment an initial access to a network for the radio resource control connection; code for transitioning, by the user equipment, from radio resource control idle mode to radio resource control connected mode; and code for the user equipment performing one of suspending the idle-mode configuration or maintaining the idle-mode configuration, for at least a duration of the radio resource control connected mode.

In another exemplary embodiment, an apparatus comprises: means for determining, at a user equipment configured with an idle-mode configuration for using a preconfigured uplink resource, that data not associated with the preconfigured uplink resource is to be transmitted or to be received via a radio resource control connection; means for performing by the user equipment an initial access to a network for the radio resource control connection; means for transitioning, by the user equipment, from radio resource control idle mode to radio resource control connected mode; and means for the user equipment performing one of suspending the idle-mode configuration or maintaining the idle-mode configuration, for at least a duration of the radio resource control connected mode.

In an exemplary embodiment, a method is disclosed that includes receiving at a base station in a wireless communication network an initial access to the network for the radio resource control (RRC) connection. The method includes determining, at the base station, that the user equipment is configured with an idle-mode configuration for using a preconfigured uplink resource. The method also includes transitioning, by the base station, the user equipment from RRC idle mode to RRC connected mode. The method includes performing communication between the base station and the user equipment to perform one or more actions to modify one or both of the idle-mode configuration of the user equipment or an RRC connection corresponding to the transition into the RRC connected mode.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform at least the following: receiving at a base station in a wireless communication network an initial access to the network for the radio resource control (RRC) connection; determining, at the base station, that the user equipment is configured with an idle-mode configuration for using a preconfigured uplink resource; transitioning, by the base station, the user equipment from RRC idle mode to RRC connected mode; and performing communication between the base station and the user equipment to perform one or more actions to modify one or both of the idle-mode configuration of the user equipment or an RRC connection corresponding to the transition into the RRC connected mode.

An exemplary computer program product includes a computer-readable storage medium bearing computer program code embodied therein for use with a computer. The computer program code includes: code for receiving at a base station in a wireless communication network an initial access to the network for the radio resource control (RRC) connection; code for determining, at the base station, that the user equipment is configured with an idle-mode configuration for using a preconfigured uplink resource; code for transitioning, by the base station, the user equipment from RRC idle mode to RRC connected mode; and code for performing communication between the base station and the user equipment to perform one or more actions to modify one or both of the idle-mode configuration of the user equipment or an RRC connection corresponding to the transition into the RRC connected mode.

In another exemplary embodiment, an apparatus comprises: means for receiving at a base station in a wireless communication network an initial access to the network for the radio resource control (RRC) connection; means for determining, at the base station, that the user equipment is configured with an idle-mode configuration for using a preconfigured uplink resource; means for transitioning, by the base station, the user equipment from RRC idle mode to RRC connected mode; and means for performing communication between the base station and the user equipment to perform one or more actions to modify one or both of the idle-mode configuration of the user equipment or an RRC connection corresponding to the transition into the RRC connected mode.

DETAILED DESCRIPTION OF THE DRAWINGS

The following abbreviations that may be found in the specification and/or the drawing figures are defined as follows:

3GPP third generation partnership project
5G fifth generation
5GC 5G core network
ACK acknowledgement
AMF access and mobility management function
comm. communication
CSS Common Search Space
CU central unit
DCI Downlink Control Identifier D-PUR Dedicated Preconfigured Uplink Resource
D-PUR-RNTI D-PUR Radio Network Temp identifier
DU distributed unit
EDT Early Data Transmission
eNB (or ENB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FFS For Further Study
gNB (or gNodeB) base station for 5G/NR, i.e., a node providing NR user plane and control plane protocol terminations towards the UE, and connected via the NG interface to the 5GC
HARQ Hybrid Automatic Repeat reQuest
I/F interface
IMSI International Mobile Subscriber Identity
IoT Internet of Things
LTE long term evolution
MAC medium access control
MME mobility management entity
MO Mobile Originated
MPDCCH MTC Physical Downlink Control CHannel
MT Mobile Terminated
MTC Machine-Type Communication
NACK negative acknowledgement
NB-IoT Narrow Band-Internet of Things
ng or NG new generation
ng-eNB or NG-eNB new generation eNB
NPDCCH NB-IoT Physical Data Control Channel
NPUSCH-F2 NPUSCH-Format 2
NR new radio
N/W or NW network
PDCP packet data convergence protocol
PDSCH Physical Downlink Shared CHannel
PHY physical layer
PUR Preconfigured Uplink Resource
PUSCH Physical Uplink Shared CHannel
RAN radio access network
Rel release
RLC radio link control
RNTI Radio Network Temporary Identifier
RRH remote radio head
RRC radio resource control
RU radio unit
Rx receiver
SDAP service data adaptation protocol
SGW serving gateway
SMF session management function
SPS Semi-Persistent Scheduling
S-TMSI System Architecture Evolution-Temporary Mobile Subscriber Identity
TA Timing Advance
TS technical specification
Tx transmitter
UE user equipment (e.g., a wireless device)
UL uplink
UPF user plane function
USS UE specific Search Space
WI Work Item
WUS Wake Up Signal The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The rest of this disclosure is divided into sections for ease of reference. The first section describes possible exemplary systems, the second section describes exemplary processes, the third section describes additional exemplary details, and the fourth and final section has additional comments.

I. Possible Exemplary Systems

The exemplary embodiments herein describe techniques for maintaining, suspending, or modifying existing PUR configuration in response to a UE entering into an RRC connected mode (also referred to as a state herein). Additional description of these techniques is presented after a system into which the exemplary embodiments may be used is described.

Figure 1:
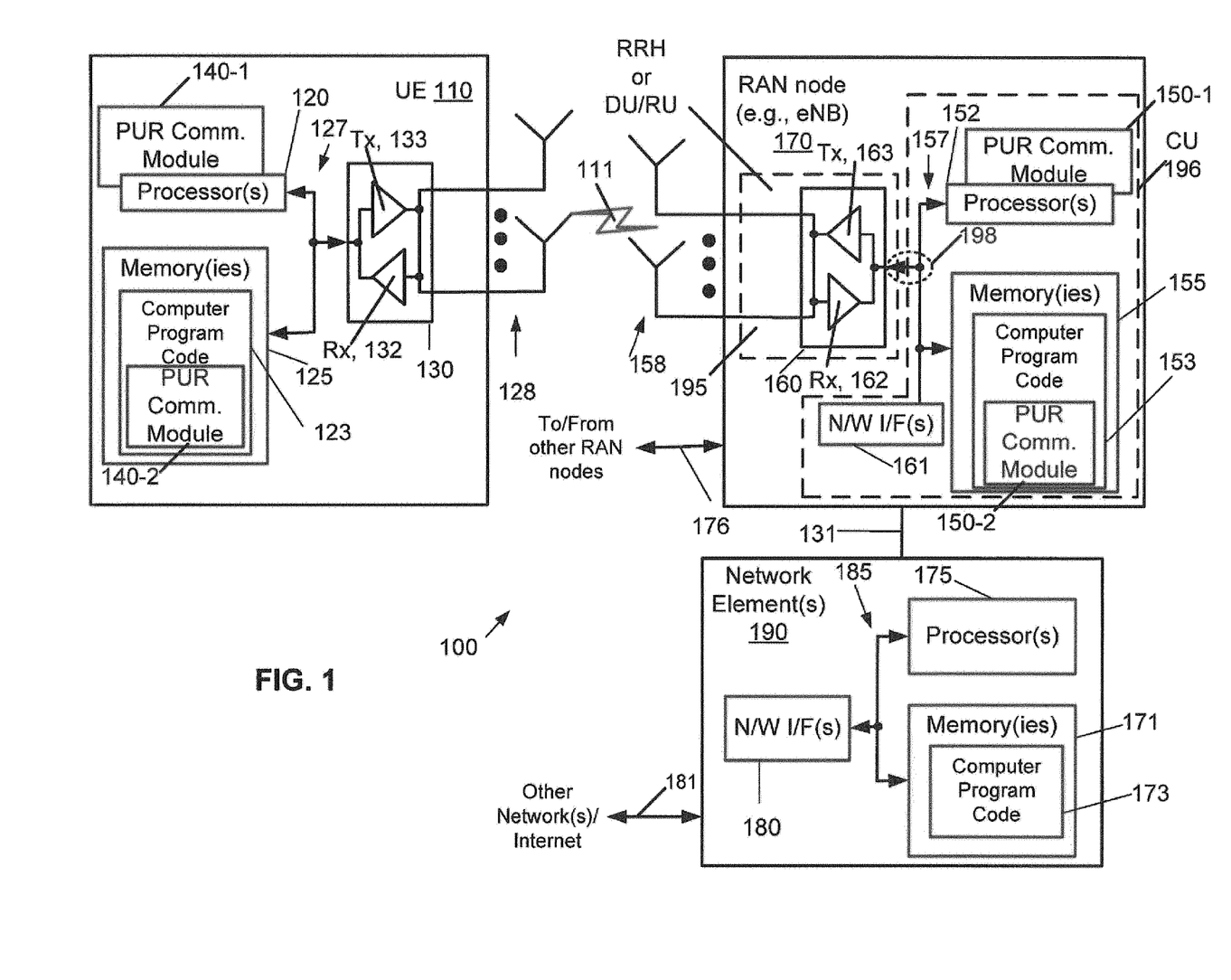
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. A user equipment (UE) 110, radio access network (RAN) node 170, and network element(s) 190 are illustrated. In FIG. 1, a user equipment (UE) 110 is in wireless communication with a wireless network 100. A UE is a wireless device that can access a wireless network and is likely a MTC/IoT UE device. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a PUR communication (Comm.) module 140, comprising one of or both parts 140-1 and/or 140-2, which may be implemented in a number of ways. The PUR Comm. module 140 may be implemented in hardware as PUR communication module 140-1, such as being implemented as part of the one or more processors 120. The PUR communication module 140-1 may be implemented also as an integrated circuit or through other hardware such as a programmable gate array. In another example, the PUR communication module 140 may be implemented as PUR communication module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100. The RAN node 170 may be, for instance, a base station for 5G, also called New Radio (NR), or a base station for LTE, an eNB (evolved Node B). The latter (eNB) is assumed below, but 5G is also possible. In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a PUR communication (Comm.) module 150, comprising one of or both parts 150-1 and/or 150-2, which may be implemented in a number of ways. The PUR communication module 150 may be implemented in hardware as PUR communication module 150-1, such as being implemented as part of the one or more processors 152. The PUR communication module 150-1 may be implemented also as an integrated circuit or through other hardware such as a programmable gate array. In another example, the PUR communication module 150 may be implemented as PUR communication module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the PUR communication module 150 may be distributed, such as being distributed between the DU 195 and the CU 196, or be implemented solely in the DU 195.

The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

II. Exemplary Processes

Having thus introduced one suitable but non-limiting technical context for the practice of the exemplary embodiments of this invention, the exemplary embodiments will now be described with greater specificity.

We envisage that devices using PUR may have long quiet periods in IDLE mode between PUR transmissions. For example, a home smart meter device using PUR may wait a whole week before sending a compressed summary of usage over that week. But during that week between PUR transmissions, an urgent unscheduled event, e.g., a temporary power cut from the device (e.g., UE) side or a network-initiated update, may require the same device to establish a temporary RRC connection with the network. What has yet to be discussed and that can affect standards is how to handle such a scenario, and whether the pre-existing PUR configuration should be allowed to continue or whether the pre-existing PUR configuration should be reconfigured.

As described above, the closest question raised so far touching this area is the following: "Question 26. Are there other scenarios for release of a D-PUR allocation and methods to apply the release?" Additionally, in the RAN2 email discussion discussing various D-PUR related signaling, described above, the question of how to handle D-PUR configurations in the event of temporary RRC connections has yet to be discussed.

Figure 5:
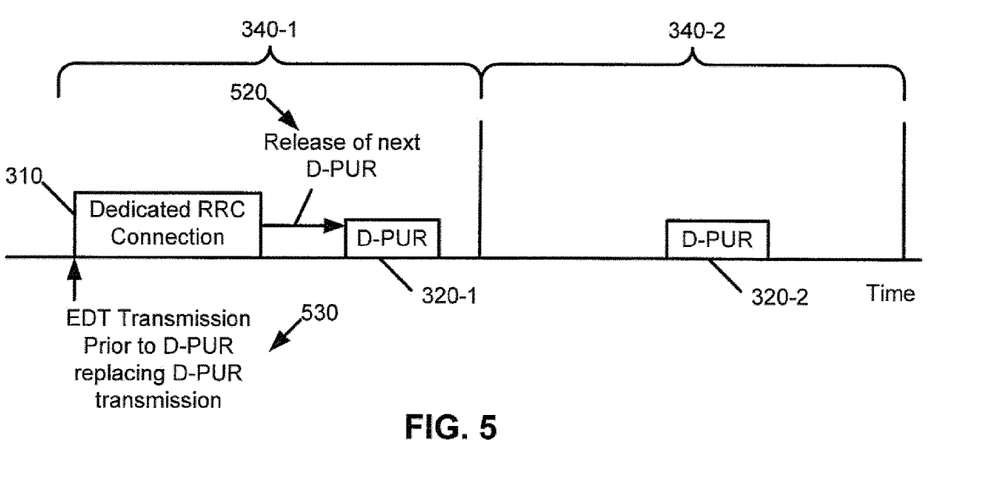
FIG. 5 is an illustration of another scenario where a UE sends a packet associated with the D-PUR prior to the D-PUR occasion via an EDT procedure, in an exemplary embodiment.

The exemplary embodiments address how to handle a scenario where an RRC connection with the network will be established by the UE and the UE already has an existing PUR configuration and the data for the RRC connection is not associated with that PUR configuration. In more detail, the exemplary embodiments provide examples of how to operate (e.g., setup, modify, release) a (e.g., new, spontaneous, unscheduled) RRC connection in parallel to a preconfigured UL resource (PUR) in NB-IoT (MTC/IoT UE device and base station). The PUR configuration may be dedicated (that is, a UE is assigned a dedicated or unique time/frequency resources) or shared (that is, several UEs are assigned the same or overlapping time/frequency resources). Although much of the disclosure herein concerns D-PUR, it is to be noted that the techniques described herein are applicable to PUR in general, e.g. including shared PUR (S-PUR). Dedicated PUR is also known as contention-free PUR (i.e. there is no contention on the time/frequency resources) while shared PUR is also known as contention-based PUR (i.e. there are possible contention on the time/ frequency resources since multiple UEs are assigned the same or overlapping time/frequency resources). Two situations may occur: 1) An RRC transmission (e.g., a transmission scheduled by the eNB when the UE is in the RRC connected mode) overlaps with D-PUR transmission and the UE is reconfigured to postpone D-PUR transmission or combine (e.g., include) data of D-PUR transmission into the RRC transmission; and 2) The RRC transmission is before a next-scheduled D-PUR transmission and the UE may anticipate the transmission of data foreseen at D-PUR, e.g., and send the data for the D-PUR in the RRC transmission. The first situation (1) is illustrated, e.g., in FIG. 3, and the second situation (2) is illustrated, e.g., in FIG. 5.

In additional detail regarding PUR, consider the following. Dedicated preconfigured UL resource is defined as a PUSCH resource used by a single UE: PUSCH resource is time-frequency resource; and Dedicated PUR is contention-free. Contention-free shared preconfigured UL resource (CFS PUR) is defined as a PUSCH resource simultaneously used by more than one UE: The PUSCH resource is at least time-frequency resource; and CFS PUR is contention-free. Contention-based shared preconfigured UL resource (CBS PUR) is defined as a PUSCH resource simultaneously used by more than one UE: The PUSCH resource is at least time-frequency resource; and CBS PUR is contention-based (CBS PUR may require contention resolution). All of these types of PURs may be addressed by the techniques presented herein.

Figure 2:
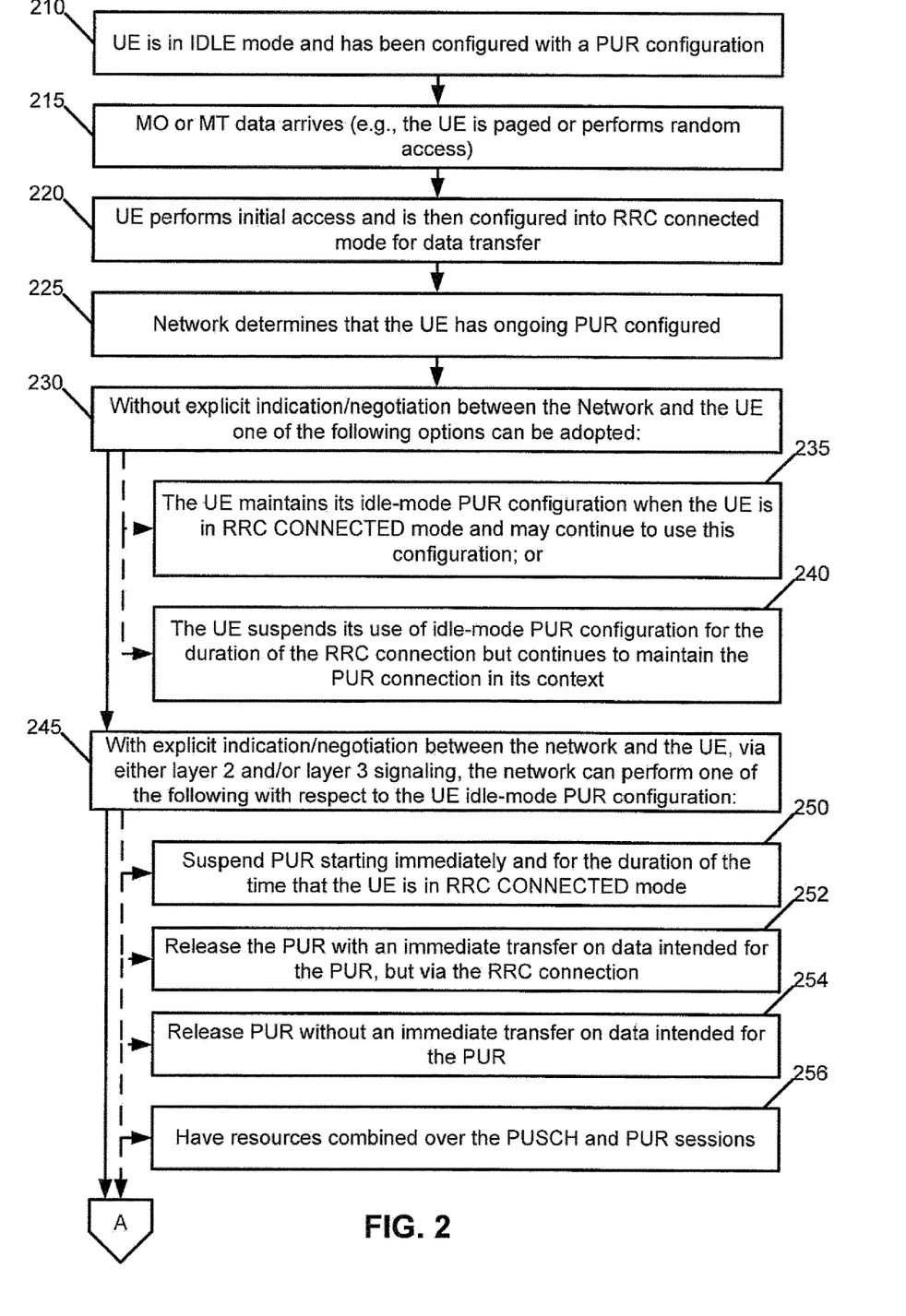
FIG. 2 is a logic flow diagram for RRC connection with PUR configuration, in accordance with exemplary embodiments.

The following is a description of the actions taken by the UE 110 and the RAN node 170, which will be referred to as eNB 170 below. Reference may be made to FIG. 2, which is a logic flow diagram for RRC connection with PUR configuration, in accordance with exemplary embodiments. FIG. 2 illustrates the operation of an exemplary method or methods, a result of execution of computer program instructions embodied on a computer readable memory, functions performed by logic implemented in hardware, and/or interconnected means for performing functions in accordance with exemplary embodiments. The UE 110 performs the functions in the blocks under control of the PUR communication module 140, and the eNB 170 performs the functions in the blocks under control of its PUR communication module 150.

Before proceeding with a description of FIG. 2, it is noted that it is up to the eNB whether PUR and RRC transmissions use the same or different resources. The PUR resources are preconfigured (i.e., fixed) whereas the RRC resources are dynamic (i.e., scheduled by eNB). When UE performs PUR transmission, the UE always knows where to transmit based on the existing PUR configuration. When the UE performs RRC transmission, the resources are provided per each transmission by the eNB via scheduling grant DCI.

It is assumed that the UE 110 is in IDLE mode and has been configured with a PUR configuration. See block 210. Mobile originated (MO) or mobile terminated (MT) data arrives (e.g., the UE is paged or performs random access). See block 215. There is an initial access by the UE 110, which is then configured (by the network) into RRC connected mode for data transfer. See block 220.

In block 225, the network (e.g., eNB 170) determines that the UE has ongoing PUR configured. Methods of achieving this include but are not limited to the following:

1) Post full RRC connection establishment, the network (e.g., the eNB 170) can determine this from the IMSI/S-TMSI.
2) During the RRC connection establishment, the UE can forward an identifier, e.g. the PUR RNTI and/or a UE specific identifier (which may be important for shared PUR) allocated during the PUR configuration, indicating what PUR configuration (dedicated or shared) the identifier is allocated in. Alternately, the network can also determine this from IMSI/S-TMSI during RRC connection establishment.

It is possible for there to be explicit indication/negotiation for the idle-mode PUR configuration between the network and the UE. That is, an indication (or negotiation) helping the network to associate an existing PUR configuration with the same UE now transitioning into RRC CONNECTED mode. This is described in reference to block 230. It is possible for there to be explicit indication/negotiation between the network and the UE. This is described in reference to block 230.

In block 230, without explicit indication/negotiation between the network and the UE one of the following options can be adopted:

a) The UE maintains its idle-mode PUR configuration when the UE is in RRC CONNECTED mode and may continue to use this configuration during the RRC CONNECTED mode (i.e., UE can continue to use the time/frequency resources allocated in the PUR configuration). See block 235. Note that if the UE discontinues use of this configuration, it is up to the UE to determine whether to request and get another PUR configuration.

When UE continues to transmit uplink data using the time/frequency resources allocated in the PUR configuration, it is assumed that there are search spaces associated with the PUR configuration for the UE to receive DCI and/or ACK/NACK. Furthermore, the UE will also be configured with a control channel search space associated with connected mode transmission and reception. Note that overlap of PDSCH and the PUR DCI is an issue only for half-duplex devices, which cannot transmit (PUSCH) and receive (DCI) at the same time. Consequently, in the event that the PUSCH or PDSCH (half-duplex devices only) allocated in the RRC CONNECTED mode overlaps with the PUR DCI search space and/or PUR PUSCH, the following options exist:

1) The UE monitors only one control channel search space at a time and that CONNECTED mode search space is prioritized over the D-PUR search space. Depending on the configurations of PDSCH and search spaces, the UE may continue to monitor both the PUR and connected mode PDSCH search spaces.

2) The PUR counters/timers for PUR release are either suspended or reset when there is a CONNECTED mode transmission.

b) The UE suspends its use of idle-mode PUR configuration for the duration of the RRC connection but continues to maintain the PUR configuration in its context. See block 240. That is, although the UE is not allowed to use the PUR while the UE is in RRC CONNECTED mode (use is "suspended"), the UE does not throw away the configuration information. When the UE is released back to the RRC IDLE mode (i.e., after the duration of the RRC connection), the UE resumes the use of the PUR configuration. Thus, when the UE is released back to the idle mode, the UE resumes its use of the PUR configuration with an updated TA value if the validity of the PUR configuration has not yet expired.

With explicit indication/negotiation between the network and the UE, via either layer 2 and/or layer 3 signaling, the network can perform one of the following with respect to the UE idle-mode PUR configuration (see block 245):

1) Suspend PUR (i.e., suspend the grant/applicability of the PUR configuration to the UE) starting immediately (e.g., in response to the UE transitioning into RRC CONNECTED mode or state) and for the duration of the time that the UE is in the RRC CONNECTED mode (see block 250). As for "immediately" suspending PUR, there is always a response time, based on processing an indication, and the like. So, PUR would be suspended in response to the UE transitioning into RRC CONNECTED mode and ideally would be performed as quickly as the UE could suspend PUR. The eNB 170 may reallocate the resources while the UE is in RRC CONNECTED mode. Although the UE does not have access to the PUR during the time the UE is in RRC CONNECTED mode, the UE maintains the PUR configuration in its context. The PUR counters/timers for PUR release are either suspended or are continued to be run when the UE is in RRC CONNECTED mode. If the PUR counters/timers for PUR release were suspended when the UE is in RRC CONNECTED mode, they can be continued again after the UE leaves RRC CONNECTED mode. When the UE is released back to the idle mode, the validity of the PUR configuration resumes if the configuration has not yet expired.

2) Release PUR with an immediate (e.g., quickly, in response to the indication/negotiation) transfer on data intended for the PUR, but via the RRC connection. See block 252. That is, the release of the PUR means these PUR configurations are no longer reserved for the UE.

3) Release PUR without an immediate (e.g., quickly, in response to the indication/negotiation) transfer on data intended for the PUR. See block 254.

4) Have resources combined over the PUSCH and PUR sessions. See block 256. In other words, the UE uses both PUR and PUSCH (granted in RRC CONNECTED) for transfer of uplink data intended for the PUR.

5) Have PUSCH resources be maximally overlapping with the PUR sessions. See block 258. For this block, the granted PUSCH resources are made to overlap with the PUR to the maximum extent possible. The idea is to have the same UE reuse the previously granted PUR as much as possible.

6) Manage the HARQ process associated with the dedicated connection to allow the PUR HARQ process transmission to happen in parallel with the dedicated connection. See block 260. That is, restrict the dedicated mode UE to a single HARQ process mode when the PUR transmission region is overlapped. This is required if the UE wants to continue the PUR transmission independently along with the dedicated mode.

If the PUR session is still ongoing, the UE is to update the saved PUR TA to the latest value prior to releasing RRC connection and transitioning into idle mode. See block 265.

If SPS is supported for the dedicated mode transmission, the eNB can configure the UE to either (see block 270):

1) Defer resource location for the D-PUR transmission outside the SPS resource location. See block 275.

2) Defer the SPS transmission outside the D-PUR resource location. See block 280.

In block 285, if the RRC connection or EDT was established just prior to the D-PUR occasion to deliver the same data meant for D-PUR because a condition for PUR is not met at UE (e.g., the timing advance value is no longer valid at the UE) and if the RRC connection completes before the D-PUR occasion itself (e.g., which is possible if for instance uplink data in the form of a sensor report is available in advance prior to the D-PUR occasion to check the validity of PUR usage), then the:

1) UE indicates that the RRC-Connection/EDT is meant to send the D-PUR data associated with next PUR occasion. See block 290.
2) On successful packet transmission, the eNB and UE also release the PUSCH resource for the upcoming PUR occasion. See block 295. But the remaining D-PUR occasions are valid, as the UE has received valid timing advance via this procedure.

III. Additional Exemplary Details

Figure 3:
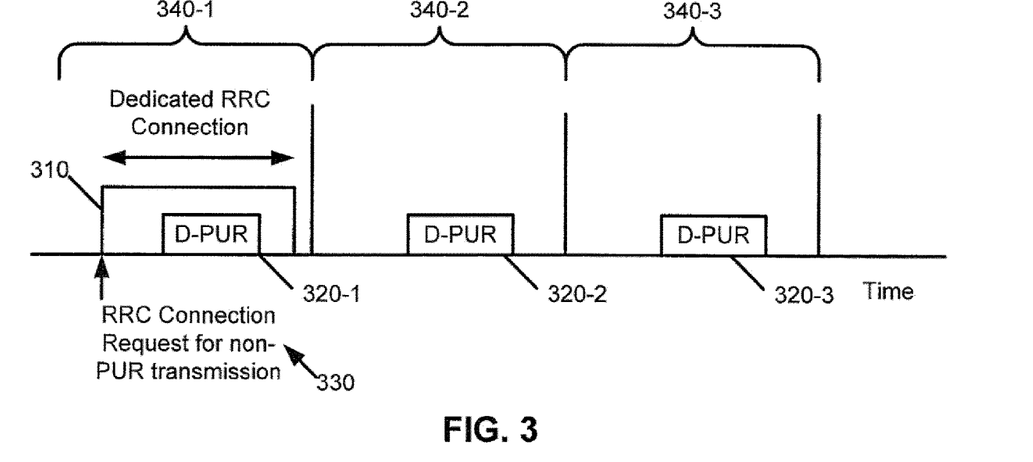
FIG. 3 is an illustration of a scenario addressed by the exemplary embodiments.

One scenario addressed by the exemplary embodiments is illustrated in FIG. 3. FIG. 3 shows three PUR allocations 340-1, 340-2, and 340-3, and corresponding D-PURs 320-1, 320-2, and 320-3 in each of the PUR allocations 340. The dedicated RRC connection 310 established for non-PUR transmission overlaps with the D-PUR 320-1 already assigned for the UE. There is a RRC Connection Request for non-PUR transmission (see reference 330), which means a corresponding dedicated RRC connection 310 would completely overlap the D-PUR 320-1.

Figure 4:
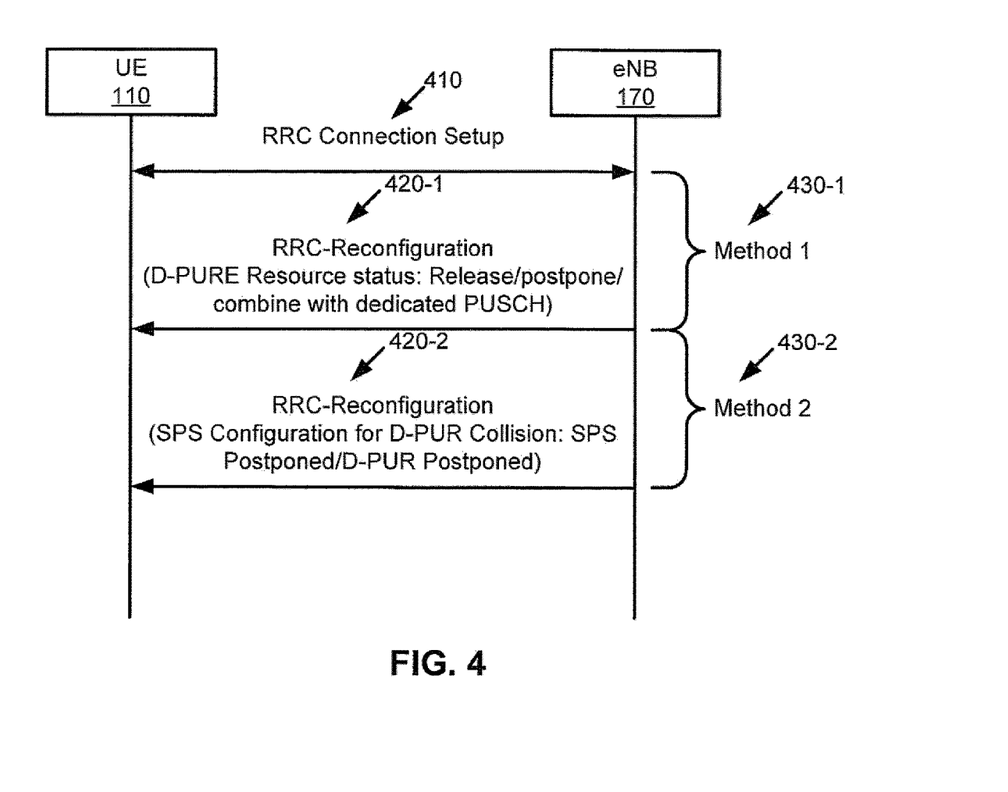
FIG. 4 is a signaling diagram between a UE and an eNB and illustrates two methods for RRC reconfiguration, in exemplary embodiments.

Two different RRC Configurations on modifying the D-PUR resource for dedicated connection or SPS are illustrated in FIG. 4, which is a signaling diagram between a UE and an eNB and illustrates two methods for RRC reconfiguration. There is an RRC Connection Setup message 410 from the UE 110 to the eNB 170. There are two examples of RRC Reconfiguration messages 420. For RRC Reconfiguration message 420-1, this message includes a D-PUR Resource status of Release/Postpone/combine-with-dedicated PUSCH. This is Method 1 430-1. That is, the D-PUR Resource should be one of the following: released ("Release"); postponed ("Postponed"); or combined with dedicated PUSCH ("combine-with-dedicated PUSCH"). Postponed means that the use of the D-PUR is postponed until after the RRC connection is released. Meanwhile, "suspended" is used to imply that the D-PUR is not used during the RRC connection, but the configuration is still maintained such that the configuration can be used after the RRC connection is released. The combined with dedicated PUSCH means data intended for the PUR is transferred using both the PUR and PUSCH resources granted in RRC CONNECTED.

For RRC Reconfiguration message 420-2, this message includes an SPS Configuration for D-PUR Collision having a value of one of SPS Postponed/D-PUR Postponed. This is Method 2 430-2. This is useful, e.g., for a situation as shown in FIG. 3, where the D-PUR and dedicated RRC connection overlap. The value of "SPS Postponed" means that the SPS transmission is deferred until outside the D-PUR resource location (see, e.g., block 280 of FIG. 2). The value of "D-PUR Postponed" means that the resource location for the D-PUR transmission is deferred until outside the SPS resource location (see, e.g., block 275 of FIG. 2).

There is a case where the UE sends a packet associated with the D-PUR prior to the D-PUR occasion via an EDT procedure. See FIG. 5, which is an illustration of another scenario where a UE sends a packet (in the dedicated RRC connection 310) associated with the D-PUR prior to the D-PUR occasion 320-1 via an EDT procedure, in an exemplary embodiment. See also reference 530 and blocks 285, 290, and 295 of FIG. 5. This may happen if the UE determines that the UE does not meet the validity criteria for using the D-PUR transmission. In such cases, as part of RRC connection release, the eNB also indicates (see reference 520) to release the next D-PUR instance. Further D-PUR instances are valid, as the UE has a valid timing advance via this EDT procedure. This is applicable for RRC connection setup case also.

Figure 6:
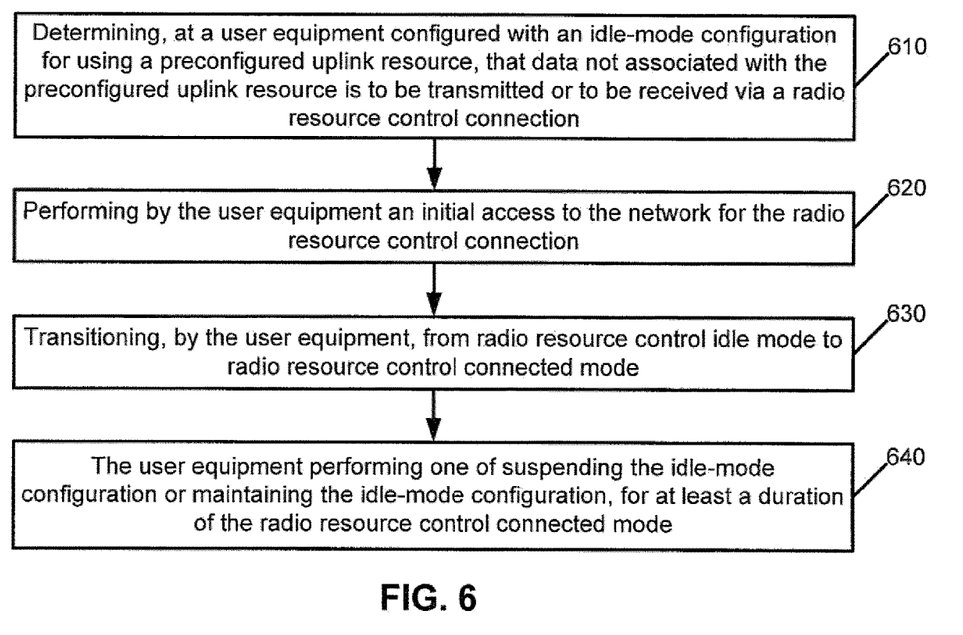
FIG. 6 is a logic flow diagram performed by a UE for maintaining, suspending, or modifying existing PUR configuration in response to the UE entering into RRC connected mode.

Referring to FIG. 6, this figure is a logic flow diagram performed by a UE for maintaining, suspending, or modifying existing PUR configuration in response to the UE entering into RRC connected mode. This figure illustrates the operation of an exemplary method or methods, a result of execution of computer program instructions embodied on a computer readable memory, functions performed by logic implemented in hardware, and/or interconnected means for performing functions in accordance with exemplary embodiments. The blocks in this figure are performed by a UE 110, e.g., under control of the PUR communication (Comm.) module 140, at least in part.

In block 610, the flow starts with determining, at a user equipment configured with an idle-mode configuration for using a preconfigured uplink resource, that data not associated with the preconfigured uplink resource is to be transmitted or to be received via a radio resource control connection. In block 620, the flow proceeds with performing by the user equipment an initial access to the network for the radio resource control connection. The UE 110, in block 630, performs transitioning from radio resource control idle mode to radio resource control connected mode. The UE 110 in block 640 performs one of suspending the idle-mode configuration or maintaining the idle-mode configuration, for at least a duration of the radio resource control connected mode.

In the following examples, the method of FIG. 6 is referred to as example 1.

Example 2. The method of example 1, wherein transitioning, by the user equipment, from radio resource control idle mode to radio resource control connected mode has been initiated by paging reception.

Example 3. The method of any of examples 1 or 2, wherein the method comprises the user equipment maintaining its idle-mode configuration when the user equipment is in radio resource control connected mode and one of continuing to use or discontinuing to use this configuration after the radio resource control connected mode.

Example 4. The method of any of examples 1 or 2, wherein the method comprises the user equipment suspending its use of the idle-mode configuration for a duration of the radio resource connected mode but continuing to maintain the idle-mode configuration in its context and using the idle-mode configuration after the end of the radio resource connected mode in response to the idle-mode configuration still being valid.

Example 5. The method of any of examples 1 to 4, wherein the method further comprises:
  in response to a radio resource control (RRC) connection setup by the user equipment for setting up the RRC connection for the transmitting of the data, receiving at the user equipment and from the network a preconfigured uplink resource (PUR) resource status of one of (i) release or (ii) postpone or (iii) combine-with-dedicated physical uplink shared channel (PUSCH) for the RRC connection; and
  the user equipment performing a corresponding one of the following: (i) releasing a PUR resource for the idle-mode configuration; (ii) postponing transmission on the PUR resource for the idle-mode configuration until after a transmission on the RRC connection; or (iii) transmitting data in one or both of the PUR or the PUSCH resources granted in the RRC connected mode.

Example 6. The method of any of examples 1 to 4, wherein the method further comprises:

in response to an RRC connection setup by the user equipment for setting up the radio resource control connection for the transmitting of the data, receiving at the user equipment and from the network a semi-persistent scheduling (SPS) configuration for preconfigured uplink resource (PUR) collision having a value of one of SPS postponed or PUR postponed; and the user equipment performing a corresponding one of the following: deferring a resource location for a PUR transmission outside an SPS resource location; or deferring the SPS transmission outside the PUR resource location.

Figure 7:
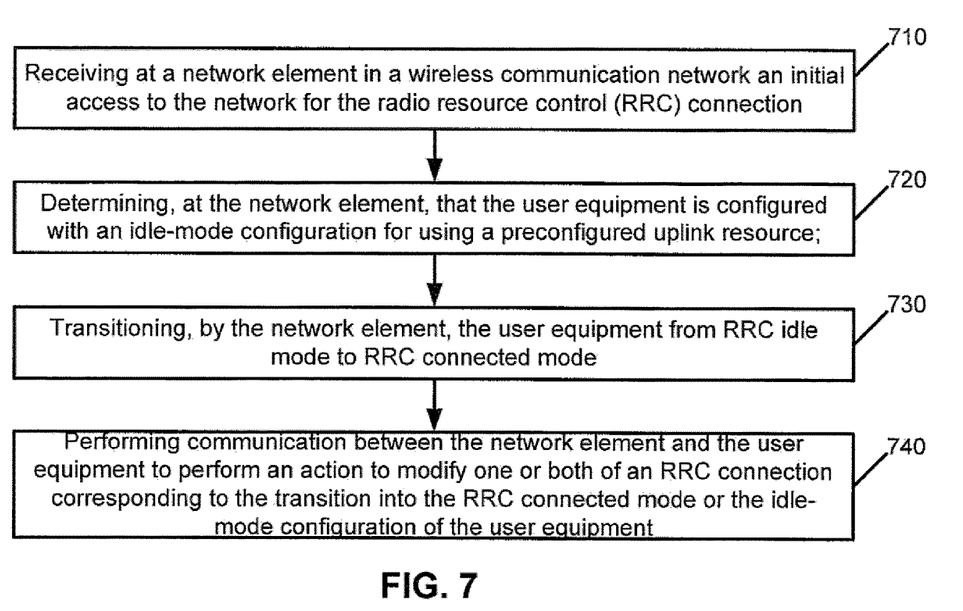
FIG. 7 is a logic flow diagram performed by a network element for maintaining, suspending, or modifying existing PUR configuration in response to the UE entering into RRC connected mode.

Turning to FIG. 7, this figure is a logic flow diagram performed by a network element for maintaining, suspending, or modifying existing PUR configuration in response to the UE entering into RRC connected mode. This figure illustrates the operation of an exemplary method or methods, a result of execution of computer program instructions embodied on a computer readable memory, functions performed by logic implemented in hardware, and/or interconnected means for performing functions in accordance with exemplary embodiments. The blocks in this figure are performed by a network element, which is assumed to be a base station such as an eNB (or other RAN node) 170, e.g., under control of the PUR communication (Comm.) module 150, at least in part.

In block 710, the flow starts with receiving at a base station in a wireless communication network an initial access to the network for the radio resource control (RRC) connection. The base station in block 720 determines that the user equipment is configured with an idle-mode configuration for using a preconfigured uplink resource. The base station performs, in block 730, transitioning the user equipment from RRC idle mode to RRC connected mode. In block 740, the base station performs communication between the base station and the user equipment to perform one or more actions to modify one or both of an RRC connection corresponding to the transition into the RRC connected mode or the idle-mode configuration of the user equipment.

In the following examples, the method of FIG. 7 is referred to as example 7.

Example 8. The method of example 7, wherein the method comprises:

in response to an RRC connection setup by the user equipment for setting up a radio resource control connection, sending by the network and toward the user equipment a preconfigured uplink resource (PUR) resource status of one of (i) release or (ii) postpone or (iii) combine-with-dedicated physical uplink shared channel (PUSCH) for the RRC connection to cause the user equipment to perform a corresponding one of the following: (i) release a PUR resource for the idle-mode configuration; (ii) postpone transmission on the PUR resource for the idle-mode configuration until after the transmission on the RRC connection; or (iii) transmit data in one or both of the PUR or the PUSCH resources granted in the RRC connected mode.

Example 9. The method of example 7, wherein the method comprises, in response to an RRC connection setup by the user equipment for setting up the radio resource control connection for the transmitting of the data, sending by the network and toward the user equipment a semi-persistent scheduling (SPS) configuration for preconfigured uplink resource (PUR) collision having a value of one of SPS postponed or PUR postponed to cause the user equipment to perform a corresponding one of the following: defer a resource location for a PUR transmission outside an SPS resource location; or defer the SPS transmission outside the D-PUR resource location.

Example 10. The method of any of examples 7 to 9 wherein performing communication between the base station and the user equipment to perform one or more actions to modify one or both of the radio resource control connection or the idle-mode configuration of the user equipment further comprises: causing the user equipment to suspend preconfigured uplink resource (PUR) in response to the user equipment transitioning into the RRC connected mode and for a duration of time that the user equipment is in RRC connected mode.

Example 11. The method of any of examples 7 to 9 wherein performing communication between the base station and the user equipment to perform one or more actions to modify one or both of the radio resource control connection or the idle-mode configuration of the user equipment further comprises: causing the user equipment to release preconfigured uplink resource (PUR), with a transfer on data intended for the PUR but via the RRC connection, the transfer in response to the user equipment transitioning into the RRC connected mode.

Example 12. The method of any of examples 7 to 9 wherein performing communication between the base station and the user equipment to perform one or more actions to modify one or both of the radio resource control connection or the idle-mode configuration of the user equipment further comprises: causing the user equipment to release preconfigured uplink resource (PUR) without a transfer on data intended for the PUR, the transfer in response to the user equipment transitioning into the RRC connected mode.

Example 13. The method of any of examples 7 to 9 wherein performing communication between the base station and the user equipment to perform one or more actions to modify one or both of the radio resource control connection or the idle-mode configuration of the user equipment further comprises: having resources combined over physical uplink shared channel (PUSCH) and preconfigured uplink resource (PUR) sessions, wherein the PUSCH session is for the radio resource control connection.

Example 14. The method of any of examples 7 to 9 wherein performing communication between the base station and the user equipment to perform one or more actions to modify one or both of the radio resource control connection or the idle-mode configuration of the user equipment further comprises: having PUSCH resources be maximally overlapping with the preconfigured uplink resource (PUR) sessions, wherein the physical uplink shared channel (PUSCH) resources are resources for the RRC connection.

Example 15. The method of any of examples 7 to 9 wherein performing communication between the base station and the user equipment to perform one or more actions to modify one or both of the radio resource control connection or the idle-mode configuration of the user equipment further comprises: managing a hybrid automatic repeat request (HARQ) process associated with the RRC connection to allow the preconfigured uplink resource (PUR) HARQ process transmission to happen in parallel with the RRC connection.

Example 16. The method of any of examples 7 to 15, wherein the communicating is performed using one or both of layer 2 or layer 3 signaling.

Example 17. A computer program, comprising code for performing the methods of any of examples to 1 to 16, when the computer program is run on a computer.

Example 18. The computer program according to example 17, wherein the computer program is a computer program product comprising a computer-readable medium bearing computer program code embodied therein for use with the computer.

Example 19. The computer program according to example 17, wherein the computer program is directly loadable into an internal memory of the computer.

20. An apparatus, comprising:
  means for determining, at a user equipment configured with an idle-mode configuration for using a preconfigured uplink resource, that data not associated with the preconfigured uplink resource is to be transmitted or to be received via a radio resource control connection;
  means for performing by the user equipment an initial access to a network for the radio resource control connection;
  means for transitioning, by the user equipment, from radio resource control idle mode to radio resource control connected mode; and
  means for the user equipment performing one of suspending the idle-mode configuration or maintaining the idle-mode configuration, for at least a duration of the radio resource control connected mode.

Example 21. The apparatus of example 20, wherein the transitioning, by the user equipment, from radio resource control idle mode to radio resource control connected mode has been initiated by paging reception.

Example 22. The apparatus of any of examples 20 or 21, wherein the apparatus comprises means for the user equipment maintaining its idle-mode configuration when the user equipment is in radio resource control connected mode and means for performing one of continuing to use or discontinuing to use this configuration after the radio resource control connected mode.

Example 23. The apparatus of any of examples 20 or 21, wherein the apparatus comprises means for the user equipment suspending its use of the idle-mode configuration for a duration of the radio resource connected mode but continuing to maintain the idle-mode configuration in its context and using the idle-mode configuration after the end of the radio resource connected mode in response to the idle-mode configuration still being valid.

Example 24. The apparatus of any of examples 20 to 23, wherein the apparatus further comprises:
  means, responsive to a radio resource control (RRC) connection setup by the user equipment for setting up the RRC connection for the transmitting of the data, for receiving at the user equipment and from the network a preconfigured uplink resource (PUR) resource status of one of (i) release or (ii) postpone or (iii) combine-with-dedicated physical uplink shared channel (PUSCH) for the RRC connection; and
  means for the user equipment performing a corresponding one of the following: (i) releasing a PUR resource for the idle-mode configuration; (ii) postponing transmission on the PUR resource for the idle-mode configuration until after a transmission on the RRC connection; or (iii) transmitting data in one or both of the PUR or the PUSCH resources granted in the RRC connected mode.

Example 25. The apparatus of any of examples 20 to 23, wherein the apparatus further comprises:
  means, responsive to an RRC connection setup by the user equipment for setting up the radio resource control connection for the transmitting of the data, for receiving at the user equipment and from the network a semi-persistent scheduling (SPS) configuration for preconfigured uplink resource (PUR) collision having a value of one of SPS postponed or PUR postponed; and
  means for the user equipment performing a corresponding one of the following: deferring a resource location for a PUR transmission outside an SPS resource location; or deferring the SPS transmission outside the PUR resource location.

Example 26. A user equipment comprising any of the apparatus of examples 20 to 25.

Example 27. An apparatus, comprising:
  means for receiving at a base station in a wireless communication network an initial access to the network for the radio resource control (RRC) connection;
  means for determining, at the base station, that the user equipment is configured with an idle-mode configuration for using a preconfigured uplink resource;
  means for transitioning, by the base station, the user equipment from RRC idle mode to RRC connected mode; and
  means for performing communication between the base station and the user equipment to perform one or more actions to modify one or both of the idle-mode configuration of the user equipment or an RRC connection corresponding to the transition into the RRC connected mode.

Example 28. The apparatus of example 27, wherein the apparatus comprises:
  means, responsive to an RRC connection setup by the user equipment for setting up a radio resource control connection, for sending by the network and toward the user equipment a preconfigured uplink resource (PUR) resource status of one of (i) release or (ii) postpone or (iii) combine-with-dedicated physical uplink shared channel (PUSCH) for the RRC connection to cause the user equipment to perform a corresponding one of the following: (i) release a PUR resource for the idle-mode configuration; (ii) postpone transmission on the PUR resource for the idle-mode configuration until after the transmission on the RRC connection; or (iii) transmit data in one or both of the PUR or the PUSCH resources granted in the RRC connected mode.

Example 29. The apparatus of example 27, wherein the apparatus comprises means, responsive to an RRC connection setup by the user equipment for setting up the radio resource control connection for the transmitting of the data, for sending by the network and toward the user equipment a semi-persistent scheduling (SPS) configuration for preconfigured uplink resource (PUR) collision having a value of one of SPS postponed or PUR postponed to cause the user equipment to perform a corresponding one of the following: defer a resource location for a PUR transmission outside an SPS resource location; or defer the SPS transmission outside the D-PUR resource location.

Example 30. The apparatus of any of examples 27 to 29 wherein the means for performing communication between the base station and the user equipment to perform one or more actions to modify one or both of the radio resource control connection or the idle-mode configuration of the user equipment further comprises: means for causing the user equipment to suspend preconfigured uplink resource (PUR) in response to the user equipment transitioning into the RRC connected mode and for a duration of time that the user equipment is in RRC connected mode.

Example 31. The apparatus of any of examples 27 to 29 wherein the means for performing communication between the base station and the user equipment to perform one or more actions to modify one or both of the radio resource control connection or the idle-mode configuration of the user equipment further comprises: means for causing the user equipment to release preconfigured uplink resource (PUR), with a transfer on data intended for the PUR but via the RRC connection, the transfer in response to the user equipment transitioning into the RRC connected mode.

Example 32. The apparatus of any of examples 27 to 29 wherein the means for performing communication between the base station and the user equipment to perform one or more actions to modify one or both of the radio resource control connection or the idle-mode configuration of the user equipment further comprises: means for causing the user equipment to release preconfigured uplink resource (PUR) without a transfer on data intended for the PUR, the transfer in response to the user equipment transitioning into the RRC connected mode.

Example 33. The apparatus of any of examples 27 to 29 wherein the means for performing communication between the base station and the user equipment to perform one or more actions to modify one or both of the radio resource control connection or the idle-mode configuration of the user equipment further comprises: means for having resources combined over physical uplink shared channel (PUSCH) and preconfigured uplink resource (PUR) sessions, wherein the PUSCH session is for the radio resource control connection.

Example 34. The apparatus of any of examples 27 to 29 wherein the means for performing communication between the base station and the user equipment to perform one or more actions to modify one or both of the radio resource control connection or the idle-mode configuration of the user equipment further comprises: means for having PUSCH resources be maximally overlapping with the preconfigured uplink resource (PUR) sessions, wherein the physical uplink shared channel (PUSCH) resources are resources for the RRC connection.

Example 35. The apparatus of any of examples 27 to 29 wherein the means for performing communication between the base station and the user equipment to perform one or more actions to modify one or both of the radio resource control connection or the idle-mode configuration of the user equipment further comprises: means for managing a hybrid automatic repeat request (HARQ) process associated with the RRC connection to allow the preconfigured uplink resource (PUR) HARQ process transmission to happen in parallel with the RRC connection.

Example 36. The apparatus of any of examples 27 to 35, wherein the communicating is performed using one or both of layer 2 or layer 3 signaling.

Example 37. A user equipment comprising any of the apparatus of examples 27 to 36.

Example 38. A wireless communication system comprising any of the apparatus of examples 20 to 25 and any of the apparatus of examples 27 to 36.

Exemplary advantages, technical effects, and invention aspects include one or more of the following:

1) Definition of a priority rule between PUR and PDSCH/PUSCH;
2) Definition of a rule allowing the network to suspend/reset PUR release counters/timers in the event of an RRC connection;
3) Signaling at L2/L3 to allow UE/network to decide what to do with PUR once the RRC connection is established;
4) Mechanism for the network to support combining of the PUSCH and PUR resources;
5) Mechanism for UE to deliver all PUR data via the dedicated scheduling of RRC connection where the resources assigned for D-PUR can also be reused for the scheduling;
6) Mechanism to defer either SPS or D-PUR when the scheduling both overlaps for RRC connection; and/or
7) Mechanism to deliver the sata transmission meant for D-PUR occasion via RRC connection/EDT prior to the D-PUR occasion and implicitly release the associated D-PUR (e.g., needed in case of invalidation of D-PUR prior to the transmission).

For (1), some embodiments were described above where D-PUR is suspended or released during an RRC connection. This can be understood as a rule to prioritize PUSCH (granted in the RRC connection) over PUR. In other embodiments, the UE combines both PUR and PUSCH resources granted in the RRC connection. This can be interpreted as another priority rule.

IV. Additional Comments

As used in this application, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Similarly, for (2), in some embodiments, a rule for the counters/timers is described as part of the rule that applies to the PUR.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

What is claimed is:

1. A method, comprising:
   determining, at a user equipment configured with an idle-mode configuration for using a preconfigured uplink resource, that data not associated with the preconfigured uplink resource is to be transmitted or to be received via a radio resource control connection;
   performing, by the user equipment, an initial access to a network for the radio resource control connection;
   transitioning, by the user equipment, from radio resource control idle mode to radio resource control connected mode; and
   performing, by the user equipment, one of suspending the idle-mode configuration or maintaining the idle-mode configuration, for at least a duration of the radio resource control connected mode.

2. The method of claim 1, wherein transitioning, by the user equipment, from radio resource control idle mode to radio resource control connected mode has been initiated by paging reception.

3. The method of claim 1, wherein the method comprises the user equipment maintaining its idle-mode configuration when the user equipment is in radio resource control connected mode and one of continuing to use or discontinuing to use this configuration after the radio resource control connected mode.

4. The method of claim 1, wherein the method comprises the user equipment suspending its use of the idle-mode configuration for a duration of the radio resource connected mode but continuing to maintain the idle-mode configuration in its context and using the idle-mode configuration after the end of the radio resource connected mode in response to the idle-mode configuration still being valid.

5. The method of claim 1, wherein the method further comprises:
   in response to a radio resource control (RRC) connection setup by the user equipment for setting up the RRC connection for the transmitting of the data, receiving at the user equipment and from the network a preconfigured uplink resource (PUR) resource status of one of (i) release or (ii) postpone or (iii) combine-with-dedicated physical uplink shared channel (PUSCH) for the RRC connection; and
   the user equipment performing a corresponding one of the following: (i) releasing a PUR resource for the idle-mode configuration; (ii) postponing transmission on the PUR resource for the idle-mode configuration until after a transmission on the RRC connection; or (iii) transmitting data in one or both of the PUR or the PUSCH resources granted in the RRC connected mode.

6. The method of claim 1, wherein the method further comprises:
   in response to an RRC connection setup by the user equipment for setting up the radio resource control connection for the transmitting of the data, receiving at the user equipment and from the network a semi-persistent scheduling (SPS) configuration for preconfigured uplink resource (PUR) collision having a value of one of SPS postponed or PUR postponed; and
   the user equipment performing a corresponding one of the following: deferring a resource location for a PUR transmission outside an SPS resource location; or deferring the SPS transmission outside the PUR resource location.

7. A method, comprising:
   receiving at a base station in a wireless communication network an initial access to the network for the radio resource control (RRC) connection;
   determining, at the base station, that the user equipment is configured with an idle-mode configuration for using a preconfigured uplink resource;
   transitioning, by the base station, the user equipment from RRC idle mode to RRC connected mode; and
   performing communication between the base station and the user equipment to perform one or more actions to modify one or both of the idle-mode configuration of the user equipment or an RRC connection corresponding to the transition into the RRC connected mode,
   wherein performing communication between the base station and the user equipment to perform one or more actions to modify one or both of the radio resource control connection or the idle-mode configuration of the user equipment further comprises: causing the user equipment to suspend preconfigured uplink resource (PUR) in response to the user equipment transitioning into the RRC connected mode and for a duration of time that the user equipment is in RRC connected mode.

8. The method of claim 7, wherein the method comprises:
   in response to an RRC connection setup by the user equipment for setting up a radio resource control connection, sending by the network and toward the user equipment a preconfigured uplink resource (PUR) resource status of one of (i) release or (ii) postpone or (iii) combine-with-dedicated physical uplink shared channel (PUSCH) for the RRC connection to cause the user equipment to perform a corresponding one of the following: (i) release a PUR resource for the idle-mode configuration; (ii) postpone transmission on the PUR resource for the idle-mode configuration until after the transmission on the RRC connection; or (iii) transmit data in one or both of the PUR or the PUSCH resources granted in the RRC connected mode.

9. The method of claim 7, wherein the method comprises, in response to an RRC connection setup by the user equipment for setting up the radio resource control connection for the transmitting of the data, sending by the network and toward the user equipment a semi-persistent scheduling (SPS) configuration for preconfigured uplink resource (PUR) collision having a value of one of SPS postponed or PUR postponed to cause the user equipment to perform a corresponding one of the following: defer a resource location for a PUR transmission outside an SPS resource location; or defer the SPS transmission outside the D-PUR resource location.

10. The method of claim 7 wherein performing communication between the base station and the user equipment to perform one or more actions to modify one or both of the radio resource control connection or the idle-mode configuration of the user equipment further comprises: causing the user equipment to release preconfigured uplink resource (PUR), with a transfer on data intended for the PUR but via the RRC connection, the transfer in response to the user equipment transitioning into the RRC connected mode.

11. The method of claim 7 wherein performing communication between the base station and the user equipment to perform one or more actions to modify one or both of the radio resource control connection or the idle-mode configuration of the user equipment further comprises: causing the user equipment to release preconfigured uplink resource (PUR) without a transfer on data intended for the PUR, the transfer in response to the user equipment transitioning into the RRC connected mode.

12. The method of claim 7 wherein performing communication between the base station and the user equipment to perform one or more actions to modify one or both of the radio resource control connection or the idle-mode configuration of the user equipment further comprises: having resources combined over physical uplink shared channel (PUSCH) and preconfigured uplink resource (PUR) sessions, wherein the PUSCH session is for the radio resource control connection.

13. The method of claim 7 wherein performing communication between the base station and the user equipment to perform one or more actions to modify one or both of the radio resource control connection or the idle-mode configuration of the user equipment further comprises: having PUSCH resources be maximally overlapping with the preconfigured uplink resource (PUR) sessions, wherein the physical uplink shared channel (PUSCH) resources are resources for the RRC connection.

14. The method of claim 7 wherein performing communication between the base station and the user equipment to perform one or more actions to modify one or both of the radio resource control connection or the idle-mode configuration of the user equipment further comprises: managing a hybrid automatic repeat request (HARQ) process associated with the RRC connection to allow the preconfigured uplink resource (PUR) HARQ process transmission to happen in parallel with the RRC connection.

15. The method of claim 7, wherein the communicating is performed using one or both of layer 2 or layer 3 signaling.

16. A user equipment configured to perform the method of claim 1.

17. A base station configured to perform the method of claim 7.

18. A user equipment including one or more processors and one or more memories including computer program code, the one or more memories and the computer program code are configured to, with the one or more processors, cause the user equipment to perform at least the following:
  determining, at the user equipment configured with an idle-mode configuration for using a preconfigured uplink resource, that data not associated with the preconfigured uplink resource is to be transmitted or to be received via a radio resource control connection;
  performing an initial access to a network for the radio resource control connection;
  transitioning from radio resource control idle mode to radio resource control connected mode; and
  performing one of suspending the idle-mode configuration or maintaining the idle-mode configuration, for at least a duration of the radio resource control connected mode.

19. A base station including one or more processors and one or more memories including computer program code, the one or more memories and the computer program code are configured to, with the one or more processors, cause the base station to perform at least the following:
  receiving at a base station in a wireless communication network an initial access to the network for the radio resource control (RRC) connection;
  determining that the user equipment is configured with an idle-mode configuration for using a preconfigured uplink resource;
  transitioning the user equipment from RRC idle mode to RRC connected mode; and
  performing communication between the base station and the user equipment to perform one or more actions to modify one or both of the idle-mode configuration of the user equipment or an RRC connection corresponding to the transition into the RRC connected mode,
  wherein performing communication between the base station and the user equipment to perform one or more actions to modify one or both of the radio resource control connection or the idle-mode configuration of the user equipment further comprises: causing the user equipment to suspend preconfigured uplink resource (PUR) in response to the user equipment transitioning into the RRC connected mode and for a duration of time that the user equipment is in RRC connected mode.

* * * * *